(12) United States Patent
Holtham et al.

(10) Patent No.: US 11,649,862 B2
(45) Date of Patent: May 16, 2023

(54) GUIDE ASSEMBLY

(71) Applicant: Meritor Heavy Vehicle Braking Systems (UK) Limited, Gwent (GB)

(72) Inventors: Gareth Rhys Holtham, Gwent (GB); Mark Norman, Gwent (GB); Mathew Morris, Gwent (GB); Alexander Howard, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 154 days.

(21) Appl. No.: 17/162,533

(22) Filed: Jan. 29, 2021

(65) Prior Publication Data

US 2021/0239167 A1  Aug. 5, 2021

(30) Foreign Application Priority Data

Feb. 3, 2020 (EP) ................................ 20155231

(51) Int. Cl.
| F16D 65/14 | (2006.01) |
| F16D 55/2265 | (2006.01) |
| F16D 65/00 | (2006.01) |
| F16D 55/00 | (2006.01) |

(52) U.S. Cl.
CPC ..... *F16D 55/2265* (2013.01); *F16D 65/0068* (2013.01); *F16D 65/0087* (2013.01); *F16D 2055/0016* (2013.01)

(58) Field of Classification Search
CPC ....... F16D 55/225–227; F16D 55/2265; F16D 65/0068; F16D 65/0087

USPC ............................... 188/73.44, 73.45
See application file for complete search history.

(56) References Cited

U.S. PATENT DOCUMENTS

| 4,343,381 A | 8/1982 | Haraikawa et al. |
| 5,957,245 A | 9/1999 | Anger et al. |
| 7,284,642 B2 * | 10/2007 | Macke ............... F16D 55/227 188/73.44 |
| 7,543,689 B2 * | 6/2009 | Macke ............... F16D 55/227 188/73.1 |
| 10,280,992 B2 * | 5/2019 | Fischer ............. F16D 55/22655 |
| 2007/0029147 A1 | 2/2007 | Macke et al. |
| 2019/0162256 A1 * | 5/2019 | Taylor ................. F16D 66/025 |

FOREIGN PATENT DOCUMENTS

| CN | 2541667 Y | 3/2003 |
| CN | 1936356 A | 3/2007 |
| CN | 107002784 A | 8/2017 |
| CN | 108700146 A | 10/2018 |
| CN | 108884885 A | 11/2018 |
| CN | 109281961 A | 1/2019 |

(Continued)

OTHER PUBLICATIONS

Chinese Office Action dated Jul. 18, 2022 for related Chinese Appln. No. 202110119028.7; 9 Pages.

(Continued)

*Primary Examiner* — Christopher P Schwartz
(74) *Attorney, Agent, or Firm* — Brooks Kushman PC (57) ABSTRACT

A disc brake guide assembly having a guide bush, a closure, and a stop. The guide bush may be mountable in a through bore of a support. The closure may be a barrier to the ingress of foreign matter into the through bore. The stop may restrict axial displacement of the guide bush.

20 Claims, 6 Drawing Sheets

(56) References Cited

FOREIGN PATENT DOCUMENTS

| | | |
|---|---:|---|
| DE | 2647911 A1 | 10/1977 |
| DE | 10245027 A1 | 4/2004 |
| DE | 10311896 A1 | 9/2004 |
| DE | 102013006852 A1 | 10/2014 |
| DE | 102016100137 A1 | 7/2017 |
| EP | 3051163 A1 | 8/2016 |
| EP | 3492768 A1 | 6/2019 |
| GB | 2551855 A1 | 1/2018 |
| WO | 2009050751 A1 | 4/2009 |

OTHER PUBLICATIONS

European Search Report dated Jul. 13, 2020 for related European Patent Appln. No. 20155231.2; 9 Pages.

\* cited by examiner

GUIDE ASSEMBLY

TECHNICAL FIELD

The present teachings relate to a disc brake and particularly but not exclusively to a guide assembly for slidably mounting a caliper of a disc brake.

BACKGROUND

Disc brakes are commonly used for braking heavy vehicles such as trucks, buses and coaches.

Heavy vehicle disc brakes conventionally comprise a brake carrier and a caliper. The brake carrier is arranged to support brake pads on each side of a rotor. The caliper is slidably mounted on the brake carrier by two or more guide assemblies, such that when the disc brake is actuated, the caliper is able to slide with respect to the brake carrier so that both brake pads are urged onto opposing faces of a brake rotor in a clamping action to effect braking.

A guide assembly typically comprises a guide pin of the carrier along which the caliper can slide and a bore disposed in the caliper for receiving the guide pin.

To achieve free sliding of the caliper in a broad range of operating conditions, the guide assemblies must take account of manufacturing tolerances, effects of heating or cooling in use, and accommodate deflections of the disc brake due to the braking torque. Various arrangements are known to achieve this but typically involve one guide assembly being a close running fit within a respective bore and the other providing a degree of play by use of an elastomeric guide bush or a guide bush mounted within the bore that has clearance to its corresponding guide pin.

Such arrangements have been proven over many years' service but can be costly to manufacture and generate noise in operation where a metallic guide bush is used, or have a limited lifespan in the case of elastomeric guide bushes.

The present teachings seek to alleviate the problems associated with the prior art.

SUMMARY

A first aspect of the teachings provides a disc brake guide assembly for permitting axial movement of a disc brake caliper relative to a support, e.g., a disc brake carrier, the assembly comprising a guide bush to be mounted in a through bore of the caliper and having a non-circular outer surface; a closure arranged to be seated at least partially within the through bore and be a barrier to the ingress of foreign matter into the through bore; and a stop to be retained by the closure and dimensioned radially so as to restrict axial displacement of the guide bush in at least a first direction, in use.

This allows a less close fitting arrangement of the guide bush to the housing to be to be required to axially retain the guide bush. In turn this may enable the guide bush to have less strength and be formed from alternative, possibly lower cost, and/or lighter materials, or for the guide bush to be thinner. The non-circular shape allows rotation of the guide bush to be inhibited if fitted into a caliper bore with a corresponding non-circular inner shape and therefore a correct orientation of the guide bush to be maintained.

Optionally, the stop is fixedly mounted to or integral with the closure.

This minimizes part count and simplifies assembly.

Optionally, the closure comprises a cover portion and a bore engagement portion, the stop being axially spaced from the cover portion.

This allows a guide pin portion of the support to slide past the axial end of the guide bush, thereby minimizing the required length of the guide bush and potentially minimizing wear of the guide bush.

Optionally, the closure comprises a bore engagement portion and the stop is a radially inward projection from the bore engagement portion.

This provides a convenient form for the stop.

Optionally, the stop is integrally and monolithically formed from the bore engagement portion.

This may further simplify manufacture of the guide assembly.

Optionally, the stop has an internal radius greater than or equal to a largest internal radius of the guide bush.

This arrangement allows the corresponding guide pin to have a purely cylindrical outer form and be able to slide past the stop.

Optionally, the guide bush is formed from a rigid plastics material, for example a composite of polymeric material and low friction material, such as PTFE.

The use of such a guide bush may be lower cost and lower weight than a conventional metallic guide bush, and have lower noise levels in use. Further it may be more durable than an elastomeric guide bush.

Optionally, the guide bush has a non-circular, e.g., oval and/or slotted, internal profile.

This allows for some lateral play to avoid the binding of the caliper relative to the carrier when there are deflections or other misalignments under load, wear, or temperature effects.

A second aspect of the teachings provides a disc brake caliper incorporating a guide assembly according to the first aspect of the teachings.

Optionally, the through bore is dimensioned such that the guide bush is a light interference fit therewith.

This allows a lower strength guide bush to be used that does not need to withstand the forces required to withstand a full interference fitting.

Optionally, a closure receiving portion of the through bore has a larger diameter than a guide bush receiving portion.

This allows a step between the portions to act as a stop that aids the positioning of the closure. It further allows the non-circular feature to be machined into the bore and the guide bush to be fitted into the bore from the closure side.

Optionally, the through bore comprises a fixed stop at the side thereof that opposes the closure.

This is a way of simplifying assembly without requiring accurate axial alignment or additional mounting steps to achieve the secure and correct assembly.

A third aspect of the teachings provides a disc brake guide assembly for permitting relative axial movement of a disc brake caliper relative to a support, e.g., a disc brake carrier, the assembly comprising a tubular guide bush to be mounted in a through bore of the caliper wherein the guide bush has a non-circular outer surface and is formed from a rigid polymeric material.

A material of this type has been found to be durable, low weight and to reduce the noise emitted by a disc brake to which it is fitted is operation. The non-circular shape allows rotation of the guide bush to be inhibited if fitted into a caliper bore with a corresponding non-circular inner shape and therefore a correct orientation of the guide bush to be maintained. A non-circular shape may be more easily formed in a material of this type.

Optionally, the guide bush further comprises a low friction or lubricant material, e.g., PTFE.

The provision of a lubricant or low friction material has been found to ensure the smooth sliding of a guide pin within the guide bush without requiring an additional external lubricant to be supplied.

Optionally, the guide bush outer surface is predominantly circular with protrusion extending radially therefrom.

A guide bush of this shape may allow for simpler machining of the corresponding bore in which it is to fit, e.g., using only rotary cutting tools.

Optionally, the guide bush inner surface has a depression formed therein in substantial alignment with the protrusion, such that a wall thickness of the guide bush has a reduced variation.

Beneficially, this may ensure that the enhanced dimensional stability/reduced differential expansion of the guide bush is achieved during manufacture and use if subjected to variations in exposure to heat.

Optionally, the guide bush has a non-circular, e.g., oval, internal profile.

This allows for some lateral play to avoid the binding of the caliper relative to the carrier when there are deflections or other misalignments under load, wear, or temperature effects.

BRIEF DESCRIPTION OF THE DRAWINGS

Embodiments of the present teachings will now be described, by way of example only, with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
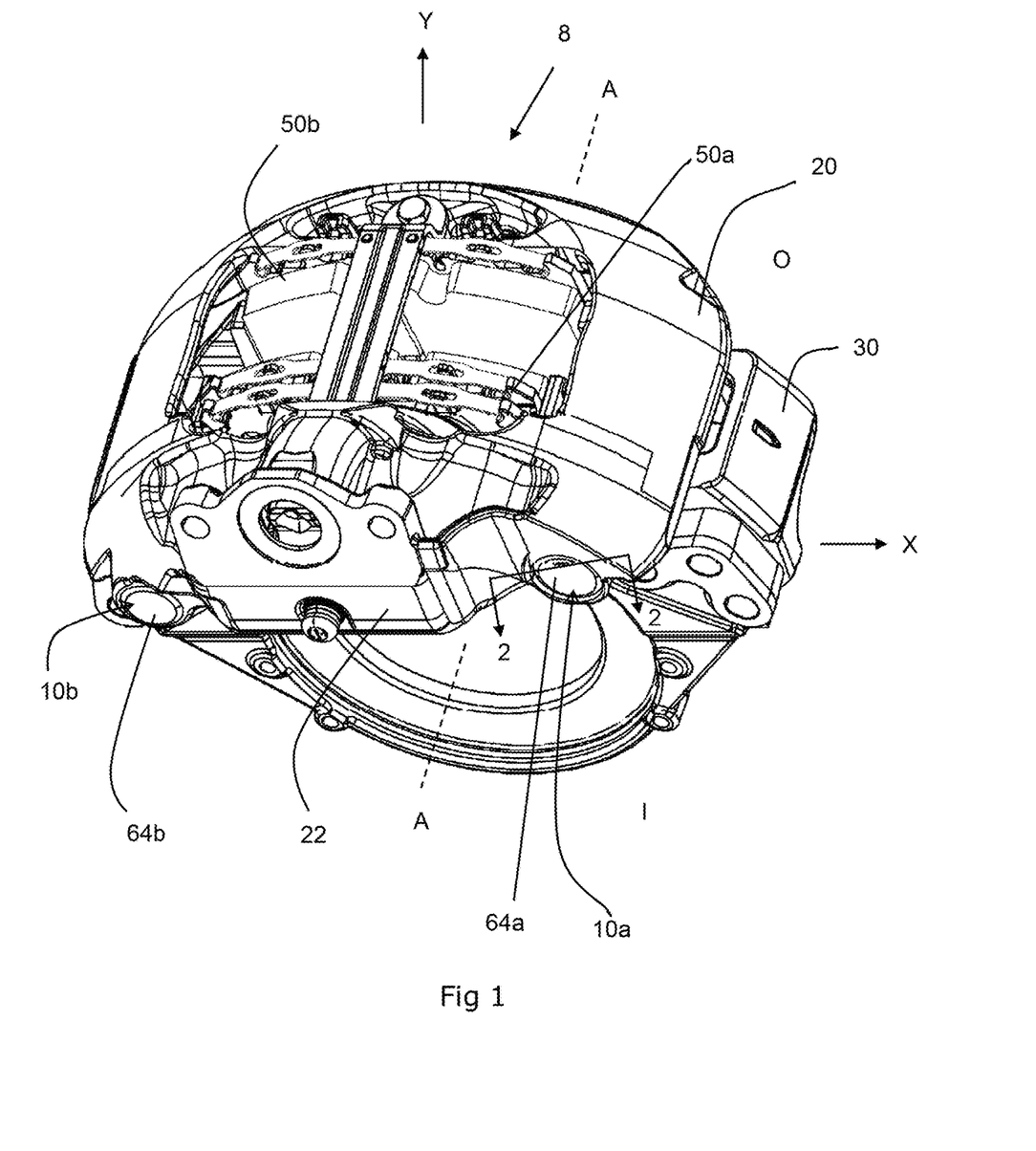
FIG. 1 is an isometric view of a disc brake having the guide assembly of a first embodiment and second embodiment of the present teachings.

FIG. 1 depicts an embodiment of a disc brake 8 of a type utilized for heavy vehicles such as trucks, buses and coaches.

Various orientations of the disc brake are described. In particular the directions inboard I and outboard O refer to the typical orientation of the disc brake when fitted to a vehicle and with reference to the longitudinal center line of the vehicle. The radial direction Y refers to an orientation with reference to the center of the brake rotor (axis A-A) and is for example the direction in which brake pads may be fitted and removed from a disc brake. The circumferential direction X refers to a tangent to the direction of the rotation of the rotor and is for example the direction in which a friction induced load from a brake pad is laterally transmitted into an abutment of a brake carrier.

The disc brake comprises a caliper 20 slidably mounted with respect to a brake carrier 30 by two guide assemblies 10a and 10b. The caliper 20 has a housing 22 typically formed from cast iron or steel. The carrier 30 is typically also formed from cast iron or steel.

The brake carrier 30 carries an inboard brake pad 50a and an outboard brake pad 50b. A rotor (not shown) is rotatable about an axis extending in the axial direction A, and is positioned between the brake pads 50a and 50b. An air actuator (not shown) is provided to move the inboard brake pad 50a into frictional contact with the rotor via a suitable actuation mechanism (not shown) housed within the caliper housing 22 and which acts on the inboard brake pad 50a. When the inboard brake pad 50a is pushed towards and contacts the rotor, the caliper 20 is then caused to slide inboard along first and second caliper guide assemblies 10a and 10b.

As the caliper 20 slides inboard it moves the outboard brake pad 50b towards the rotor. Hence, the rotor becomes clamped between the inboard and outboard brake pads and the rotation of the rotor is frictionally inhibited.

So as to minimize the potential for the sliding of the caliper 20 to be prevented or restricted due to jamming or binding of the guide assemblies caused by thermal expansion, deflection under load, wear or the like, the first guide assembly 10a has a void in the circumferential direction X to allow for free running of the guide assemblies 10a, 10b even if the guide assembly is not in its nominal position. This arrangement also allows the clamp force to be evenly applied to the brake pads during a braking operation so as to assist even wear thereof. The first guide assembly 10a is a guide assembly according to a first embodiment of the present teachings.

The second guide assembly 10b is longer than the first and comprises a circular guide bush (not shown) and a complementary circular guide sleeve (not shown) and may be conventional.

Figure 2:
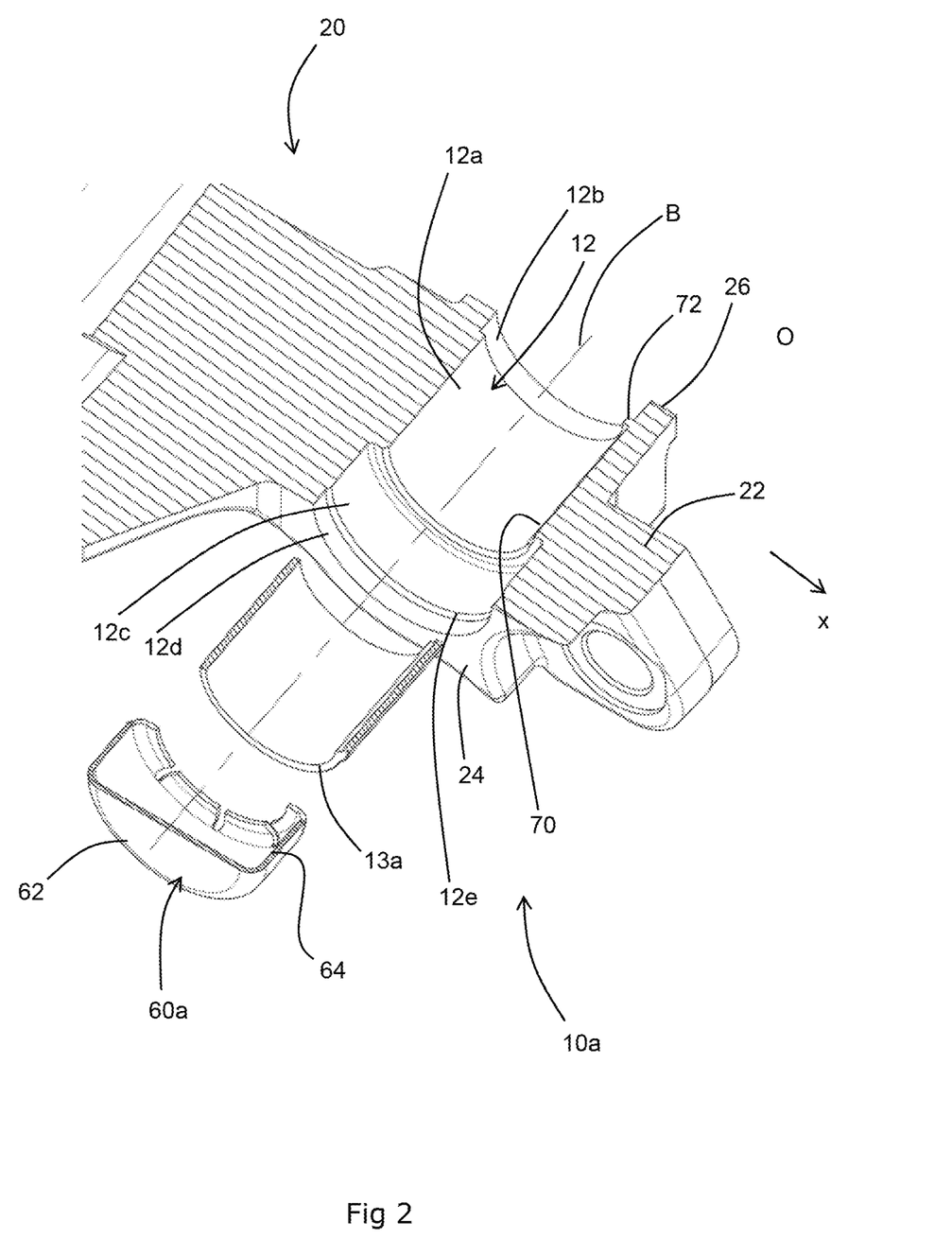
FIG. 2 is an isometric exploded cross-sectional view of a guide assembly shown in FIG. 1 on a plane 2-2 of FIG. 1 through the center of the guide assembly.
Figure 3:
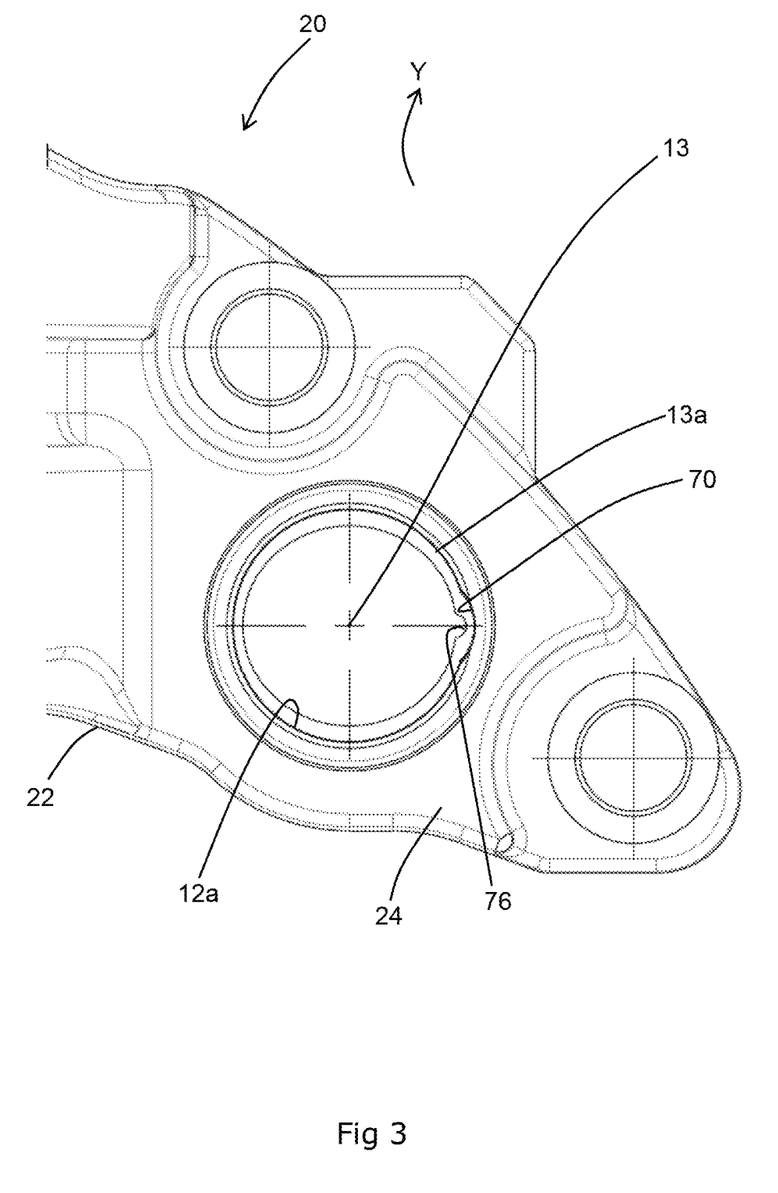
FIG. 3 shows an elevation view looking outboard of a guide bush of the guide assembly in the caliper.
Figure 7:
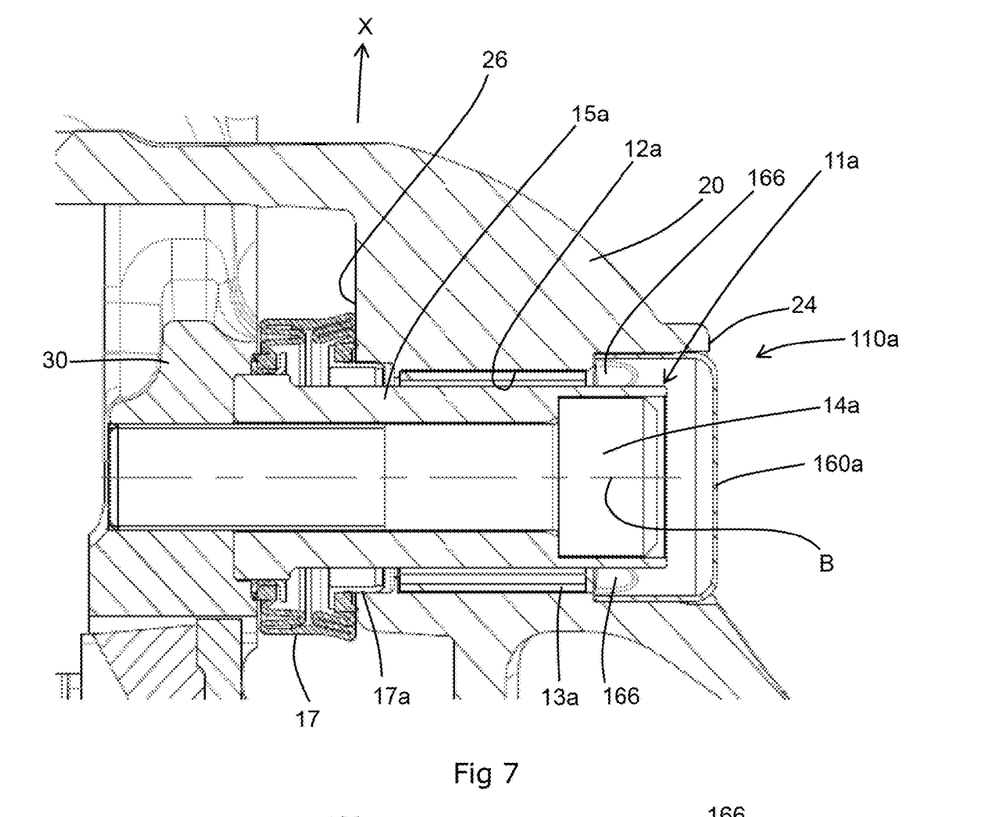
FIG. 7 shows an enlarged cross-sectional view of a guide assembly of a second embodiment on the plane 2-2 of FIG. 1.

With reference to FIGS. 2, 3 and 7 the first guide assembly 10a, comprises a bore 12 extending along on axis B, parallel to axis A, through the housing 22. The bore 12 has a generally circular cross-sectional profile to receive a guide pin 11a (see FIG. 7) and at least one guide bush 13a with a largely circular outer profile and a non-circular, e.g., oval, inner profile to guide the guide pin 11a within the bore.

The guide pin 11a is cylindrical and comprises a fastener to secure the guide pin to the brake carrier 30 in a fixed position. In this first embodiment the fastener is a bolt 14a that affixes to the brake carrier 30 by screwing into a threaded bore in the brake carrier. A guide pin (not shown) of the second guide assembly 10b is similarly secured in a fixed position with respect to the carrier.

With particular reference to FIG. 7, the guide pin 11*a* further comprises a guide sleeve 15*a* at least substantially surrounding the fastener and over which the caliper 20 slides. The guide sleeve 15*a* is a hollow tube with a substantially circular cross-sectional profile. The head of the central bore of the sleeve is stepped so that a head of the bolt 14*a* is able to hold the sleeve in place when tightened on to the carrier 30.

A convoluted bellows type seal 17 (FIG. 7) encircles the guide pin 11*a* and connects to the carrier 30 and caliper 20 to protect the guide assembly 10*a* from contamination by foreign matter.

The bore 12 of the guide assembly 10 is an elongate hole extending from a first side (inboard) 24 to the second side 26 (outboard) of the caliper housing 22. In other words the bore 12 is a through bore. The caliper 20 is slidably mounted with respect to the brake carrier 30 by sliding the guide pin 11*a* through the bore 12. Hence, when the disc brake is actuated, the caliper 20 is able to slide in the axial direction A along the guide pin 11*a*.

Figure 4:
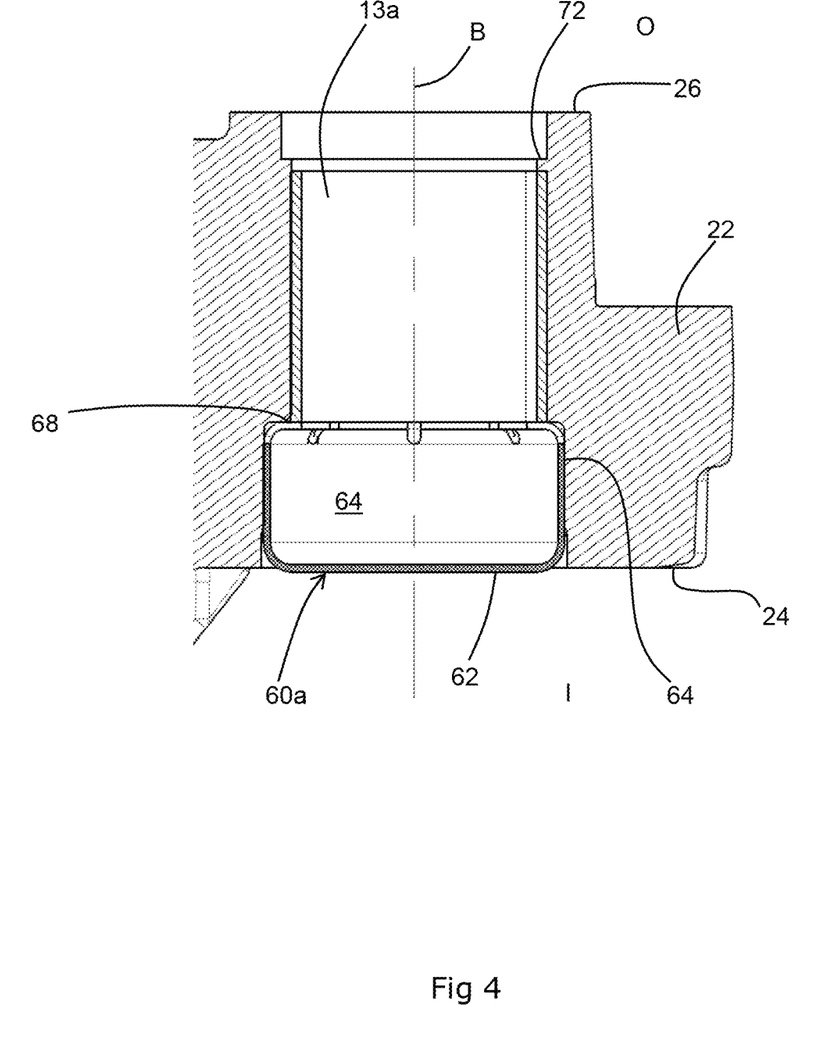
FIG. 4 shows a cross-section on the plane 2-2 through the guide assembly in an assembled state.

The guide bush 13*a* is configured to form a light interference fit with the bore 12 and acts as an inner liner in the bore. For example the nominal interference may be in the range of 1% to 3% of the minimum wall thickness of the guide bush, e.g., around 2%. In embodiment the minimum wall thickness is approximately 1.5 mm, but may be between around 1 mm and 3 mm in other embodiments. For heavy vehicle applications the internal diameter of the guide bushes are typically in a range of 25-40 mm. As can be seen in FIG. 4, the guide bush 13*a* does not extend the full depth of the bore 12.

The guide bush 13*a* may be manufactured from steel, bronze, plastic, or a composite of any of these, and may include a low friction coating such as PTFE. The guide bush 13*a* may have a plain inner surface or a suitable pattern of depressions to assist in the sliding of the caliper and the retention of lubricants.

In this embodiment the guide bush 13*a* is manufactured from a proprietary polymeric material that comprises Nylon 46 (Stanyl®) and PTFE manufactured by Igus GmbH of Cologne, Germany. The guide bush may be manufactured in a molding or extrusion process, for example.

The diameter of the guide pin 11*a* is selected to correspond to the smallest diameter of the guide bush 13*a*. Accordingly, the clearance between the guide pin 11*a* and the guide bush 13*a* in a tangential direction Y is minimal and so vibration, noise, stress and excess wear are reduced. The largest diameter of the guide bush provides a greater clearance between the guide pin and the guide bush in the circumferential direction X to allow for a predetermined amount of play to accommodate manufacturing tolerances, heat expansion and brake torque induced deflection so as to allow the sliding of the caliper 20 without binding or jamming.

With reference to FIGS. 2, 3 and 4 in particular, it can be seen that the bore 12 is not of a constant diameter, but instead has multiple diameters with steps therebetween.

In this embodiment, the smallest diameter receives the guide bush 13*a*, is referred to herein as a guide bush mounting portion 12*a*, and represents the greatest proportion of the overall length of the bore 12.

However, with reference to FIG. 3, it is apparent that this portion 12*a* is in fact non-circular, having a keyway 60 formed therein. In this embodiment the keyway 60 is rounded and may, for example, be formed by machining the bore 12 offset from its central axis B with a circular cutting tool. In FIG. 2, it can however be seen that the keyway does not extend to the end of this portion 12*a* but rather terminates close to the inboard end to form a stop 72. The remainder of the guide bush mounting portion 12*a* is however of constant diameter.

Outboard of the guide bush portion 12*a* is a seal mounting portion 12*b* that is able to receive the seal 17 as is visible in FIG. 7.

Inboard of the guide bush mounting portion 12*a* is a further larger diameter portion arranged to mount the closure 60*a* and therefore is referred to as the closure mounting portion 12*c*. Further outboard of the closure mounting portion 12*c* is a still larger diameter portion that is referred to as the closure alignment portion 12*d* that initially is able to receive a closure 60*a* (discussed in more detail below). This then transitions into an annular ramp 12*e* to aid the interference fitting of the closure 60*a* on to the closure mounting portion 12*c*.

Figures 5, 6:
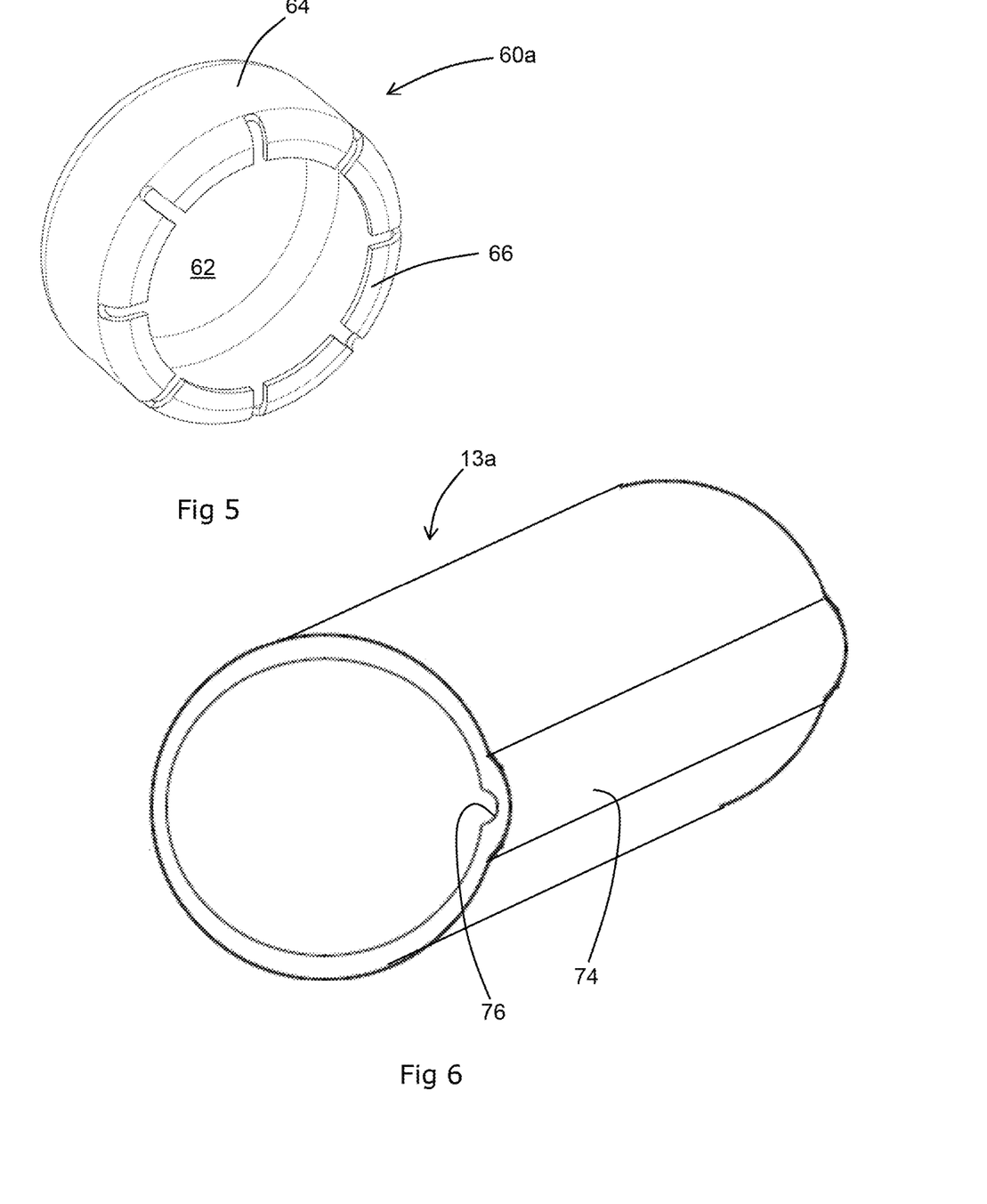
FIG. 5 shows an isometric, view of a closure of the guide assembly.
FIG. 6 shows an isometric view of the guide bush of the guide assembly.

With reference in particular to FIGS. 3 and 6 it can be seen that whilst generally cylindrical, the guide bush 13*a* has a rounded protrusion 74 that is of corresponding shape to the keyway 70 such that when mounted to the bore 12*a* it may be received in a single orientation and rotation thereof is prevented.

This ensures that the overall internal diameter of the guide bush 13*a* is always orientated so that the greatest internal diameter is aligned with the circumferential direction X and the smallest internal diameter is aligned with the tangential direction Y.

Although it may be omitted in certain embodiments, in this embodiment a semi-circular depression 76 is provided on the internal face of the guide bush 13*a* in alignment with the protrusion 74 and is of constant diameter along the length of the guide bush. This allows for a more consistent wall thickness of the guide bush 13*a* which may be advantageous in terms of ensuring the dimensional stability thereof as the guide bush is molded/extruded and subsequently cools and solidifies.

In this embodiment, the combination of the keyway 70, stop 72 and protrusion 74 ensures that a rotation of the guide bush 13*a* and axial movement thereof in an outboard direction is prevented or inhibited.

In order to inhibit the contamination of the caliper guide assembly 10*a* with foreign matter, the cap or closure 60*a* closes the inboard end of the bore 12. The closure 60*a* used for this purpose is formed from metal, e.g., stainless steel or corrosion resistant coated steel, and press fitted into the end of the bore 12*a*. In other embodiments it may be formed it may be formed of plastics material, or a composite of plastics with other materials.

The closure 60*a* comprises a disc-like cover portion 62 to act as a barrier to the ingress of foreign matter into the bore 12 and a bore engagement portion 64 that is tubular in shape and arranged, in this embodiment to be an interference fit with the closure mounting portion 12*c* of the bore 12.

The cover portion 62 and bore engagement portion 64 are in this embodiment integrally formed from the same piece of material, namely sheet metal, (e.g., stainless or anti-corrosion treated steel) that has been shaped in a pressing operation.

In this embodiment, a stop 66 to retain the guide bush 13*a* is also integral with the remainder of the closure 60*a*.

Specifically, the stop 66 comprises a radially inwardly directed lip having a plurality of discrete segments that are radially inwardly directed from the bore engagement portion 64. In this embodiment eight segments are shown, but any number from one upwards may be provided. The lip is dimensioned to terminate at essentially the same level as the internal face of the guide bush 13a where the wall is at its thinnest, or at least with a degree of overlap with the guide bush. This ensures that movement of the guide bush 13a outboard is essentially blocked by the stop 66. The provision of the stop 66 in the form of a lip enables the closure to retain the guide bush 13a, but also for the keyway 70 to be machined from the inboard end and the guide bush to be fitted from this end.

In FIG. 7, it can be seen that by spacing the stop 66 from the cover portion 62 of the closure 60a, the guide pin 11a is able to project beyond the inboard end of the guide bush 13a in an unworn brake pad condition as illustrated. As the outboard brake pad 50b wears, the caliper 20 moves inboard and this arrangement ensures that the guide pin 11a retains this overlap for the majority if not all of the range of movement of the caliper in an axial direction. In turn, this may minimize wear of the guide bush 13 due to there being no, or limited possibility, for the inboard free end of the guide pin to cause pitting of the guide bush 13a.

With reference in particular to FIG. 2, it will be appreciated that assembly of the guide assembly 10a may be achieved relatively easily by orientating the guide bush 13a with the protrusion 74 in alignment with the keyway 70 and lightly pressing it at least partially into position. The closure 60a may then be seated in the seat alignment portion 12d of the bore before being pressed into an interference engagement with the closure mounting portion 12c. If the guide bush 13a remains proud of the step between portions 12a and 12c, the pressing operation of the closure 60a will nevertheless displace the guide bush 13a to result in alignment of all of the components and the axial and rotational restraint of the guide bush 13a.

Figure 8:
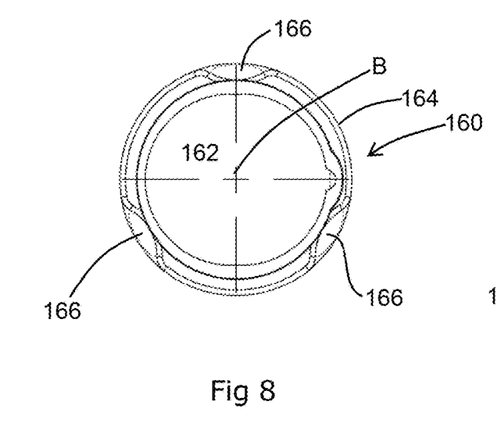
FIG. 8 shows an elevation view of the guide assembly of the second embodiment looking outboard.
Figure 9:
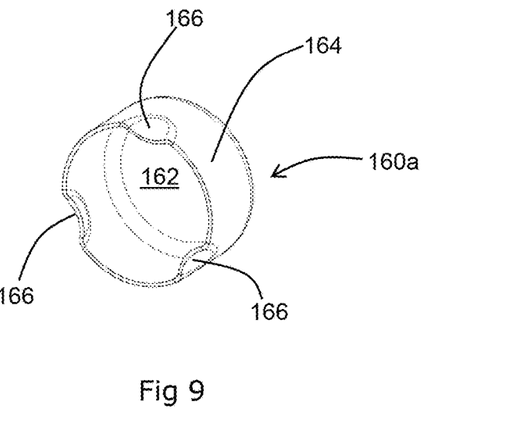
FIG. 9 is an isometric view of the closure of the second embodiment.

With reference now to FIGS. 7, 8 and 9, a further embodiment of the guide assembly 110a is illustrated. In this embodiment, only the closure differs from the first embodiment and therefore this has been labelled with equivalent numbers having the prefix "1" by comparison with the first embodiment but all other components of the guide assembly remain unchanged.

The closure 160a of this embodiment has a similar form of cover portion 162 and bore engagement portion 164 as the first embodiment. However, the stop 166 is formed by scallops or pips in the bore engagement portion 164 that extend radially inwardly and, as can be seen most clearly in FIG. 8, these overlap the end face of the guide bush 13a to prevent movement outboard.

It will be appreciated that in this embodiment three such stops are shown that the number thereof be adjusted as required from one stop upwards. The closure of this embodiment may advantageously be simpler to manufacture than that of the first embodiment. Assembly of the guide assembly 110a of this embodiment is essentially the same as that of the first embodiment.

It will be appreciated that numerous changes may be made within the scope of the present teachings. For example, the outboard end of the guide bush may be provided with a radially outwardly extending flange to contact the step between the guide bush mounting portion 12a and closure mounting portion 12c to restrict outboard movement of the guide bush 13a. In this embodiment the closure may not require a stop of smaller internal diameter than the bore engagement portion and therefore the closure may simply comprise the cover portion and bore engagement portion, and the stop being formed by the inboard end face of the bore engagement portion.

In still further embodiments, the protrusion 74 of the guide bush may not extend along the full length thereof, and the corresponding keyway 70 may only extend a corresponding depth along the guide bush mounting portion 12a such that the protrusion and keyway act as both an anti-rotation and an inboard stop feature.

In other embodiments, a stop that is separate from the closure may be provided. For example, a suitably dimensioned washer may be interposed between the guide bush and the closure to act as the stop.

In other embodiments the guide bush may be assembled in an outboard to inboard direction, with a fixed stop being located inboard of the guide bush and the bellows seal acting as an outboard stop fitted after the guide bush is inserted to act as axial retention. As can be seen in FIG. 7 the bellows seal 17 is mounted to the housing via a rigid retainer 17a that is push fitted into the seal mounting portion 12b. The rigid retainer 17a is shaped to act as a stop in a similar way to the inboard closure, or can hold a separate component such as a washer in place.

The closure may be secured in position by a mechanism other than an interference fit. For example the closure may be screwed, glued or fused into position.

The embodiments of the guide assembly are suitable for use in any type of disc brake, including pneumatic, hydraulic, electrically and mechanically actuated disc brakes. However, the embodiments are believed to be particularly beneficial in air-actuated disc brakes for heavy commercial vehicles, where rotors typically have a diameter of between 30-60 cm, meaning that the torque and heat effects may be more significant than in hydraulic disc brakes for smaller, lighter vehicles.

Although the invention has been described above with reference to one or more preferred embodiments, it will be appreciated that various changes or modifications may be made without departing from the scope of the invention as defined in the appended claims.

What is claimed is:

1. A disc brake guide assembly for permitting axial movement of a disc brake caliper relative to a support, the disc brake guide assembly comprising:
a guide bush mounted in a through bore of the disc brake caliper and having a non-circular outer surface;
a closure arranged to be seated at least partially within the through bore and be a barrier to ingress of foreign matter into the through bore; and
a stop retained by the closure and dimensioned radially so as to restrict axial displacement of the guide bush in at least a first direction, in use.

2. The disc brake guide assembly of claim 1 wherein the closure comprises a cover portion and a bore engagement portion, the stop being axially spaced from the cover portion.

3. The disc brake guide assembly of claim 2 wherein the stop is integrally and monolithically formed with the bore engagement portion.

4. The disc brake guide assembly of claim 1 wherein the outer surface has a protrusion extending radially therefrom.

5. The disc brake guide assembly of claim 4 wherein the guide bush has an inner surface that is disposed opposite the outer surface and the inner surface has a depression formed therein in substantial alignment with the protrusion such that a wall thickness of the guide bush has a reduced variation.

6. The disc brake guide assembly of claim 1 wherein the stop is fixedly mounted to or integral with the closure.

7. The disc brake guide assembly of claim 1 wherein the closure comprises a bore engagement portion and the stop is a radially inward projection from the bore engagement portion.

8. The disc brake guide assembly of claim 1 wherein the stop has an internal radius greater than or equal to a largest internal radius of the guide bush.

9. The disc brake guide assembly of claim 1 wherein the guide bush is formed from a rigid plastics material.

10. The disc brake guide assembly of claim 1 wherein the guide bush has a non-circular internal profile.

11. The disc brake guide assembly of claim 1 wherein the through bore is dimensioned such that the guide bush is a light interference fit therewith.

12. The disc brake guide assembly of claim 1 wherein a closure receiving portion of the through bore has a larger diameter than a guide bush receiving portion of the through bore.

13. The disc brake guide assembly of claim 1 wherein the through bore comprises a fixed stop at a side thereof that opposes the closure.

14. A disc brake guide assembly for permitting relative axial movement of a disc brake caliper relative to a support, the disc brake guide assembly comprising:
a tubular guide bush adapted to be mounted in a through bore of the support, wherein the guide bush has a non-circular outer surface and is formed from a rigid polymeric material, the guide bush having an inner surface that is disposed opposite the outer surface and at least partially defines a guide bush hole, a first end that extends from the inner surface to the outer surface, a second end that extends from the inner surface to the outer surface and that is disposed opposite the first end, a protrusion that extends radially from the outer surface, and a depression that is disposed opposite the protrusion and extends from the inner surface toward the outer surface, wherein the guide bush hole, the protrusion, and the depression extend from the first end to the second end.

15. The disc brake guide assembly of claim 14 wherein the guide bush further comprises a low friction or lubricant material.

16. The disc brake guide assembly of claim 15 wherein the low friction or lubricant material is PTFE.

17. The disc brake guide assembly of claim 14 wherein the guide bush has a non-circular internal profile.

18. A disc brake guide assembly for permitting axial movement of a disc brake caliper relative to a disc brake carrier, the disc brake guide assembly comprising:
a guide bush that extends around an axis and has a non-circular outer surface, wherein the guide bush is adapted to be mounted in a through bore of the disc brake caliper;
a closure that is disposed proximate the guide bush; and
a stop retained by the closure and dimensioned radially so as to restrict axial displacement of the guide bush in at least a first direction along the axis, in use.

19. A disc brake guide assembly for permitting relative axial movement of a disc brake caliper relative to a support, the disc brake guide assembly comprising:
a tubular guide bush adapted to be mounted in a through bore of the support, wherein the guide bush has a non-circular outer surface and is formed from a rigid polymeric material, the guide bush having an outer surface that is predominantly circular with a protrusion extending radially therefrom; and the guide bush having a non-circular internal profile.

20. The disc brake guide assembly of claim 19 wherein the guide bush has an oval internal profile.

* * * * *